(12) United States Patent
Katzman (10) Patent No.: US 7,296,357 B2
(45) Date of Patent: Nov. 20, 2007

(54) DEVICE AND METHOD OF MEASURING A PERSONALIZED LENS-ORIENTATION VALUE

(75) Inventor: Dan Katzman, Givat Ela (IL)

(73) Assignee: Shamir Optical Industry, Upper Galilee (IL)

( * ) Notice: Subject to any disclaimer, the term of this patent is extended or adjusted under 35 U.S.C. 154(b) by 0 days.

(21) Appl. No.: 11/357,054

(22) Filed: Feb. 21, 2006

(65) Prior Publication Data

US 2007/0193043 A1   Aug. 23, 2007

(51) Int. Cl.
*A61B 3/11* (2006.01)
(52) U.S. Cl. ............................ 33/200; 33/512; 351/204
(58) Field of Classification Search ................. 33/1 N, 33/200, 464, 511, 512; 351/204
See application file for complete search history.

(56) References Cited

U.S. PATENT DOCUMENTS

| | | | | |
|---|---|---|---|---|
| 647,522 | A | * | 4/1900 | Rideout ........................ 33/200 |
| 716,516 | A | * | 12/1902 | Boothroyd et al. ........... 33/200 |
| 734,730 | A | * | 7/1903 | Millard ........................ 33/200 |
| 1,327,163 | A | * | 1/1920 | Mathewson et al. ......... 351/204 |
| 4,451,993 | A | * | 6/1984 | Yauk ............................ 33/464 |
| 4,575,946 | A | * | 3/1986 | Bommarito ................... 33/200 |
| 4,653,192 | A | * | 3/1987 | Conrad et al. ................ 33/200 |
| 5,640,219 | A | * | 6/1997 | Ramachandran ............ 351/204 |
| 5,640,775 | A | * | 6/1997 | Marshall ....................... 33/200 |
| 6,154,969 | A | * | 12/2000 | Abitbol et al. ............... 33/200 |

FOREIGN PATENT DOCUMENTS

GB       2240405 A   *   7/1991

* cited by examiner

*Primary Examiner*—G. Bradley Bennett
(74) *Attorney, Agent, or Firm*—Pearl Cohen Zedek Latzer LLP (57) ABSTRACT

Some demonstrative embodiments of the invention include devices and/or methods of measuring a personalized lens-orientation value for a spectacle frame supporting a pair of lenses. The device, according to some demonstrative embodiments, may include a pair of orientation-measuring mechanisms, each mechanism adapted to measure a value corresponding to an orientation of a surface of a respective one of the lenses relative to a reference axis. The device may also include an adjustable positioning mechanism to adjust a distance between the pair of orientation-measuring mechanisms according to an inter-pupil distance of the user. Other embodiments are described and claimed.

22 Claims, 4 Drawing Sheets

DEVICE AND METHOD OF MEASURING A PERSONALIZED LENS-ORIENTATION VALUE

FIELD OF THE INVENTION

The invention relates generally to spectacles and, more particularly, to measuring a personalized lens-orientation value related to a spectacle frame.

BACKGROUND OF THE INVENTION

Optical spectacles, also known as eyeglasses, may include a frame supporting a pair of ophthalmic lenses.

Optical attributes, e.g. diopter values, of the lenses may be fitted, e.g., by an optometrist, to an intended user of the spectacles. For example, the optical attributes of the lenses may be fitted according to a determined impairment in the eyesight of the user.

The spectacle frame may have one of several different sizes and/or shapes. The size and/or shape of the spectacle frame may affect the horizontal positioning of the optical lens relative to the eyes of the user. Accordingly, the lens may be designed such that a vertex of the lens may be located based on a measured distance between the pupils of the user.

SUMMARY OF SOME EMBODIMENTS OF THE INVENTION

Some demonstrative embodiments of the invention include devices and/or methods of measuring a personalized lens-orientation value for a spectacle frame supporting a pair of lenses, e.g., based on a measured inter-pupil distance of the user. The personalized lens-orientation value may be implemented to customize one or more optical attributes of the lenses.

According to some demonstrative embodiments of the invention, a device to determine a personalized lens-orientation value for a spectacle frame supporting a pair of lenses may include a pair of orientation-measuring mechanisms, each mechanism adapted to measure a value corresponding to an orientation of a surface of a respective one of the lenses relative to a reference axis.

According to some demonstrative embodiments of the invention, the device may also include an adjustable positioning mechanism to adjust a distance between the pair of orientation-measuring mechanisms according to an inter-pupil distance of the user. In one example, the reference axis may be related to a line of sight of the user through the pair of lenses. In another example, the reference axis may be related to an axis connecting first and second engagement points of the pair of orientation-measuring mechanisms with the pair of lenses, respectively.

According to some demonstrative embodiments of the invention, each of the pair of orientation-measuring mechanisms may include a rotatable angle measuring element, which may be slidably mounted on the adjustable positioning mechanism.

According to some demonstrative embodiments of the invention, the angle measuring element may have a base adapted to engage a surface portion of the lens, e.g., a front surface portion of the lens.

According to some demonstrative embodiments of the invention, the angle-measuring element may be adapted to measure a value corresponding to an angle between a direction normal to the surface portion and the reference axis.

According to some demonstrative embodiments of the invention, the base portion may have a concave surface to engage the surface portion at two or more engagement points. For example, a radius of curvature of the concave surface may be smaller than 1000 millimeters, e.g., smaller than 500 millimeters.

According to some demonstrative embodiments of the invention, the device may include two sets of marks, each to indicate a plurality of predefined orientation values representing a plurality of angles to be measured by one of the angle-measuring elements. For example, at least one of the two sets of marks may include one or more marks on a respective one of the angle-measuring elements and one or more marks on the adjustable positioning mechanism.

According to some demonstrative embodiments of the invention, the plurality of angle values may include angle values between −5 degrees and 30 degrees, e.g., angle values between 0 degrees and 15 degrees.

According to some demonstrative embodiments of the invention, the positioning mechanism may include a pair of interconnected slides attached to the pair of orientation-measuring mechanisms, respectively. The pair of slides may be movable with respect to one another along a longitudinal axis.

According to some demonstrative embodiments of the invention, the positioning mechanism may include a first pin attached to a first slide of the pair of slides and fitted to move along a groove in a second one of the slides.

According to some demonstrative embodiments of the invention, the positioning mechanism may include a set of marks indicating a plurality of inter-pupil distance values, wherein the distance between the pair of orientation-measuring mechanisms is adjustable according to the set of marks. The plurality of inter-pupil distance values may include, for example, distance values between 55 and 70 millimeters.

According to some demonstrative embodiments of the invention, optical spectacles customized for a user may include a spectacle frame; and a pair of lenses supported by the frame, at least one of the lenses comprising a personalized lens having a surface shaped in accordance with a personalized lens-orientation value, which is based at least in part on an inter-pupil distance of the user and a curvature of the frame.

According to some demonstrative embodiments of the invention, the personalized lens-orientation value may correspond to an angle defined between a reference axis and a direction normal to a surface of the personalized lens, e.g., a front surface of the lens, at a location corresponding to a vertex of the personalized lens. The vertex may be located, for example, substantially at an intersection between the outer surface and a line of sight of a pupil of the user.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF SOME DEMONSTRATIVE EMBODIMENTS OF THE INVENTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, some features of the invention relying on principles and implementations known in the art may be omitted or simplified to avoid obscuring the present invention.

Some demonstrative embodiments of the invention include devices and/or methods of measuring a personalized lens-orientation value for a spectacle frame supporting a pair of lenses, e.g., based on a measured inter-pupil distance of the user, as described in detail below. The personalized lens-orientation value may be implemented to customize one or more optical attributes of the lenses, e.g., as described below.

Although the invention is not limited in this respect, it will be appreciated that the phrase "personalized lens-orientation value" as used herein may relate to an orientation, position, direction, location, posture and/or angle of a pair of lens customized for a user and supported by a spectacle frame. The personalized lens-orientation value may depend, for example, on one or more attributes of the spectacle frame, e.g., the curvature, shape, form, size, and/or configuration of the spectacle frame; and/or one or more optical attributes of the user, e.g., the measured inter-pupil distance of the user, as discussed in detail below. Although the invention is not limited in this respect, the personalized lens-orientation value may correspond, for example, to an angle between a reference axis, e.g., an axis related to the line of sight of the user, and a normal to a surface, e.g., a front surface, of the spectacle lens, for example, at a location corresponding to a vertex of the lens. Although the invention is not limited in this respect, the line of sight of the user may be defined, for example, as a direction normal to an axis connecting the pupils of the user. Although the invention is not limited in this respect, the location of the vertex of the lens may be determined, for example, based on an intersection between a surface of the lens and the line of sight of the user, e.g., as described below with reference to FIG. 1.

Different spectacle frames may have different frame curvatures. For example, some spectacles, e.g., reading spectacles, may typically have a "straight" frame, i.e., having a substantially infinite curvature. Other spectacles, e.g., sport sunglasses, may have a "wrap around" shaped frame, which may have a smaller curvature compared to the curvature of the typical reading spectacles. The curvature of the spectacle frame may affect the positioning and/or orientation of the lens relative to the eyes of the user. For example, the lens may be positioned at a first orientation relative to the eyes of the user, when placed in a first spectacle frame having a first curvature, e.g., a "wrap around" curvature; and a second orientation relative to the eyes of the user, when placed in a second spectacle frame having a second curvature, e.g., a substantially infinite curvature. Accordingly, first and second spectacles including frames having first and second curvatures, respectively, may have first and second different personalized lens-orientation values, e.g., even if intended for the same user.

The inter-pupil distance may affect the location of the vertex of each one of the spectacle lens. Accordingly, users having different inter-pupil distances may have different personalized lens-orientation values with relation to a single spectacle configuration, e.g., since the personalized lens-orientation value may depend on the inter-pupil distance of the user.

According to some demonstrative embodiments of the invention, it may be desired to determine the personalized lens-orientation value corresponding to the inter-pupil distance of the user and/or the configuration of the spectacle frame, e.g., in order to manufacture a customized lens having optical attributes fitting the configuration of the spectacle frame and/or the inter-pupil distance of the intended user. For example, a customized surface geometry of the lenses may be determined based on the personalized lens orientation value, e.g., using any suitable calculation, computation and/or algorithm. The customized lens may be produced based on the customized surface geometry, for example, using any suitable manufacturing method or process, e.g., a freeform manufacturing process as is known in the art. The free-form manufacturing process may include, for example, using a Computer Numerically Controlled (CNC) milling apparatus, which may be capable of producing the lens according to input data representing the customized surface geometry.

Some demonstrative embodiments of the invention may include a device to measure a personalized lens-orientation value for a spectacle frame supporting a pair of lenses customized for a user, e.g., based on the inter-pupil distance of the user as described in detail below.

According to some demonstrative embodiments of the invention, the device may include a pair of orientation-measuring mechanisms, each to measure a value corresponding to an orientation of a respective one of the lenses relative to a reference axis. The device may also include an adjustable positioning mechanism to adjust a distance between the pair of orientation-measuring mechanisms, e.g., according to an inter-pupil distance of the user. One or more of the pair of orientation-measuring mechanisms may include, for example, a rotatable angle measuring element which may indicate, when engaged with a surface, e.g., a front surface of one of the pair of lenses, an orientation value corresponding to an orientation of the surface being engaged in relation to the reference axis, e.g., as described below with reference to FIG. 1. The personalized lens-orientation value may be determined, for example, by positioning the device relative to the spectacles such that both orientation-measuring mechanisms measure substantially the same orientation value, e.g., as described below with reference to FIGS. 2, 3A and/or 3B.

Figure 1:
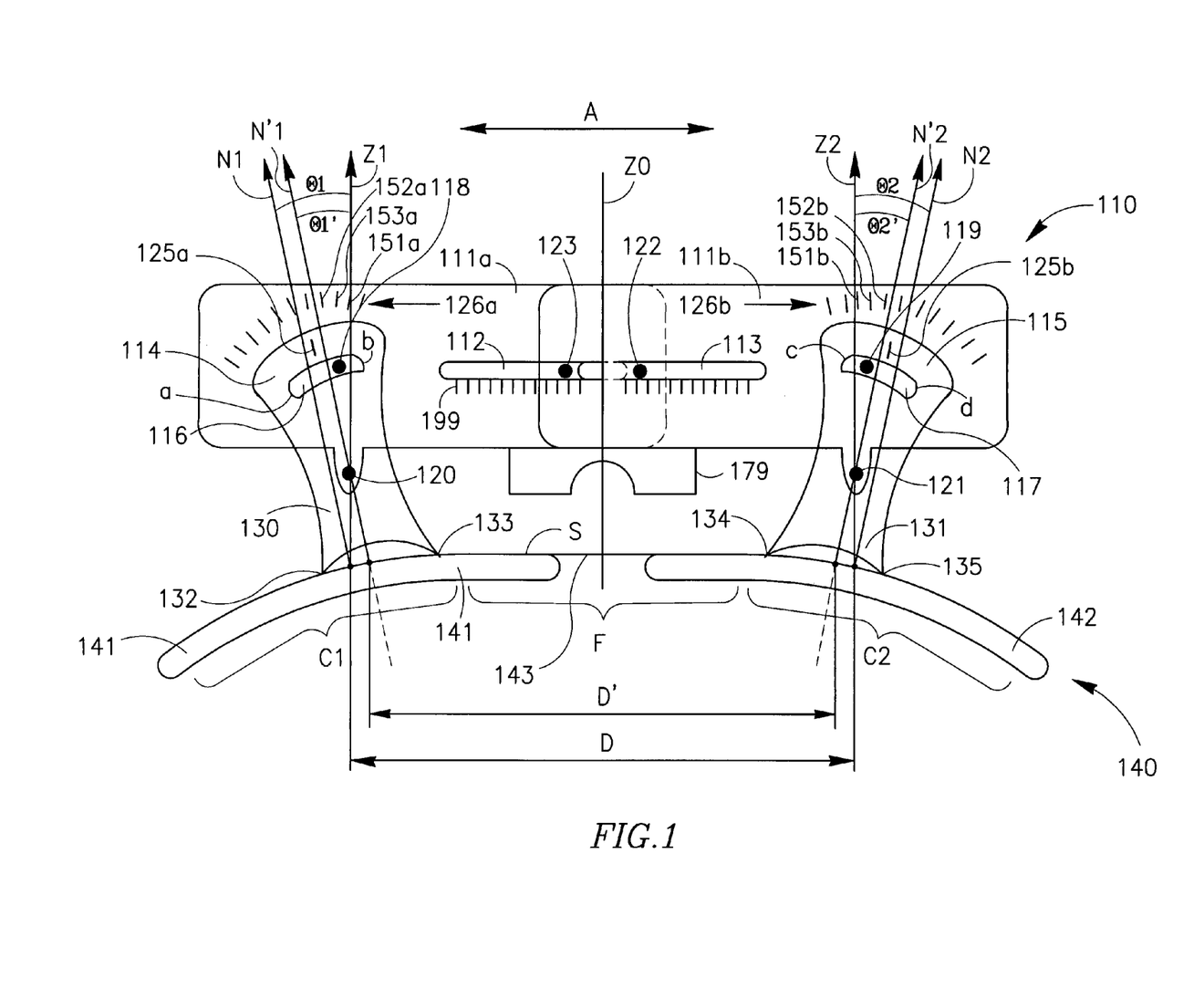
FIG. 1 is a schematic illustration of a measuring device to measure a personalized lens-orientation value for spectacles in accordance with some demonstrative embodiments of the invention.

Reference is made to FIG. 1, which schematically illustrates a device 110 to measure a personalized lens-orientation value for spectacles 140, in accordance with some demonstrative embodiments of the invention. Spectacles 140 may include a pair of lenses 141 and 142 supported by a spectacle frame 143. In some demonstrative embodiments of the invention, lenses 141 and/or 142 may include any suitable type of ophthalmic lenses and/or demonstrative ("demo") lenses, e.g., as are known in the art.

According to some demonstrative embodiments of the invention, device 110 may include a pair of orientation-measuring mechanisms, e.g., including rotatable angle-measuring elements 114 and 115. Device 110 may also include an adjustable positioning mechanism, e.g., including slides 111a and 111b, to position angle-measuring elements 114 and 115, for example, at a distance, denoted D, corresponding to an inter-pupil distance of an intended user of spectacles 140, e.g., as described below. According to some demonstrative embodiments of the invention, slides 111a and 111b may be interconnected to one another. Slides 111a and 111b may be movable with respect to one another along a longitudinal axis. For example, device 110 may include a pin 122 attached to slide 111a and fitted to move along a longitudinal groove 113 in slide 111b; and/or a pin 123 attached to slide 111b and fitted to move along a longitudinal groove 112 in slide 111a Accordingly, slides 111a and 111b may be confined to move in a longitudinal direction along a longitudinal axis, e.g., an axis defined by grooves 112 and 113, as indicated by an arrow "A" in FIG. 1.

According to some demonstrative embodiments of the invention, angle measuring elements 114 and/or 115 may be slidably mounted on slides 111a and/or 111b, respectively. For example, device 110 may include pivot pins 120 and 121 to connect a base portion 130 of angle-measuring element 114, and a base portion 131 of angle measuring element 115, respectively, to slides 111a and 111b, respectively. This configuration may enable the rotation of elements 114 and 115 relative to slides 111a and 111b, respectively.

According to some demonstrative embodiments of the invention, slides 111a and/or 111b may include one or more marks 199 representing the a plurality of predefined distances between elements 114 and 115 corresponding to a relative positioning between slides 111a and 111b. The distance between elements 114 and 115 may be defined, for example, as the horizontal distance, e.g., the distance measured in a direction parallel to the longitudinal axis, between pins 120 and 121. For example, marks 199 may include a set of values representing a set of horizontal distances between pins 120 and 121 along the longitudinal axis. According to some demonstrative embodiments of the invention marks 199 may represent a set of typical inter-pupil distance values, for example, a set of values between 50 millimeters (mm) and 80 mm, e.g., between −55=mm and 77 mm. Accordingly, the distance between elements 114 and 115 may be adjusted, e.g., according to a measured inter-pupil distance of the user, by moving slides 111a and 111b along the longitudinal axis.

According to some demonstrative embodiments of the invention, device 110 may also include a first set of orientation marks, e.g., including marks 126a on slide 111a, and/or a mark 125a on angle-measuring element 114, representing a first angle, denoted θ1, which may be measured by angle-measuring element 114; and a second set of orientation marks, e.g., including marks 126b on slide 111b, and/or a mark 125b on angle-measuring element 115, representing a second angle, denoted θ2, which may be measured by angle-measuring element 115, as described in detail below.

Although the invention is not limited in this respect, in some demonstrative embodiments of the invention, angles θ1 and θ2 may be measured according to an angular measuring scale in terms of, for example, polar units. Although the invention is not limited in this respect, the first and/or second sets of orientation marks, e.g., marks 125a, 126a, 125b, and/or 126b, may represent a set of predefined orientation angles, for example, a set of angles between −5 degrees and 30 degrees, e.g., between 0 degrees and 15 degrees.

According to some demonstrative embodiments of the invention, angle θ1 may be defined as the angle between a vertical axis, denoted Z1, e.g., vertical to the longitudinal direction A and passing through pin 120; and a direction, denoted N1, normal to a surface of lens 141 at a point of intersection with the vertical axis Z1. Angle θ2 may be defined by the angle between a vertical axis, denoted Z2, e.g., vertical to the longitudinal direction A and passing through pin 121; and a direction, denoted N2, normal to a surface of lens 142 at a point of intersection with the vertical axis Z2. It will be appreciated by those skilled in the art that angles θ1 and/or θ2 may be defined in any other manner.

It may be noted that since slides 111a and 111b may be constrained to move in longitudinal direction relative to each other, the axes Z1 and Z2 may be substantially parallel to each other. For example, both axes Z1 and Z2 may be normal to grooves 112 and 113. Therefore, the axes Z1 and Z2 may be interchangeably used as a reference axis for determining the angles θ1 and/or θ2. Although some demonstrative embodiments of the invention are described with reference to a reference axis corresponding to lines, it will be appreciated by those of ordinary skill in the art that the reference axis may be defined in relation to any other suitable axis, line, and the like. In one example, the reference axis may relate to an axis connecting first and second engagement points of the pair of orientation-measuring mechanisms with the pair of lenses, respectively, e.g., as are described below. In another example, the reference axis may be defined in relation to the line of sight of the user.

Although the invention is not limited in this respect, marks 126a may include, for example, a first mark 151a to indicate a first value of angle θ1, e.g., a zero angle; a second-mark 153a to indicate a second value of angle θ1, e.g., an angle of pi/18 radians or 10 degrees; and/or a third mark 152a to indicate a third value of angle θ1, e.g., an angle of 2*pi/18 radians or 20 degrees. Accordingly, the angle θ1 of angle-measuring element 114 relative to axis Z1 may be determined as being zero, e.g., if mark 125a of angle-measuring element 114 is aligned with mark 151a. The angle θ1 may be increased or decreased by rotating angle-measuring element 114 counterclockwise or clockwise, respectively. For example, angle θ1 may be increased to 2*pi/18 radians or 20 degrees by rotating angle-measuring element 114 until mark 125a is aligned with mark 152a.

Similarly, marks 126b may include, for example, a first mark 151b to indicate a first value of angle θ2, e.g., a zero angle; a second mark 153*b* to indicate a second value of angle θ2, e.g., an angle of pi/18 radians or 10 degrees; and/or a third mark 152*b* to indicate a third value of angle θ2, e.g., an angle of 2*pi/18 radians or 20 degrees. Accordingly, the angle θ2 of angle-measuring element 115 relative to axis Z2 may be determined as being zero, e.g., if mark 125*b* of angle-measuring element 115 is aligned with mark 151*b*. The angle θ2 may be increased or decreased by rotating angle-measuring element 1.15 counterclockwise or clockwise, respectively. For example, angle θ2 may be increased to pi/18 radians or 10 degrees by rotating angle-measuring element 115 until mark 125*b* is aligned with mark 153*b*.

Although some demonstrative embodiments of the invention may relate to a device, e.g., device 110, including a set of marks, e.g., marks 126*a*, 126*b*, 126*a*, and/or 126*b*, to indicate measured angle values, e.g., corresponding to angles θ1 and/or θ2, it will be appreciated by those of ordinary skill in the art that other embodiments of the invention may include any other suitable angle measuring configuration, mechanism and/or arrangement. For example, in an alternative embodiment (not shown in FIG. 1) angle-measuring elements 114 and/or 115 may have marks corresponding to an angular measuring scale and slides 111*a* and/or 111*b* may each have a mark to indicate the extent of angular position of angle-measuring elements 114 and 115 relative to slides 111*a* and 111*b*, respectively.

According to some demonstrative embodiments of the invention, slides 111*a* and/or 111*b* may include limiting pins 118 and/or 119, respectively, to limit the rotational movement of angle-measuring elements 114 and/or 115, respectively. For example, pins 118 and/or 119 may be fitted to move within respective grooves 116 and/or 117 of angle-measuring elements 114 and/or 115. Accordingly, the rotation of angle-measuring element 114 may be limited, for example, by the movement of pin 118 between first and second ends of groove 116, denoted "a" and "b", respectively. Similarly, the rotation of angle-measuring element 115 may be limited by the movement of pin 119 between first and second ends of groove 117, denoted "c" and According to some demonstrative embodiments of the invention, base portions 130 and/or 131 may have a shape adapted to steadily engage lenses 141 and 142, respectively. For example, base portions 130 and/or 131 may have a concave shape. Although the invention is not limited in this respect, the curvature of base portions 130 and/or 131 may be configured such that base portions 130 and/or 131 may engage a surface, e.g., a front surface, of lenses 141 and/or 142, respectively, at two or more points. For example, base portion 130 may include engagement points 132 and 133 to engage lens 141; and/or base portion 131 may include engagement points 134 and 135 to engage lens 141. Although the invention is not limited in this respect, a radius of curvature of base portions 130 and/or 131 may be smaller, for example, than a predefined maximal lens radius of curvature. For example, the radius of curvature of base portions 130 and/or 131 may be smaller than 1000 mm, e.g., smaller than 500 mm. Other shapes for base portions 130 and/or 131 may be used enabling steady engagement of base portions 130 and/or 131 with lenses 141 and/or 142, respectively.

According to some demonstrative embodiments of the invention, angle-measuring elements 114 and/or 115 may be made of a material, for example, PVC, such that they may be positioned on lenses 141 and/or 142 without causing damage, such as scratches and the like.

It will be appreciated by those of ordinary skills in the art that the measured angles θ1 and θ2 may depend on the curvatures of the surfaces being engaged by base portions 130 and 131. In one example, both angle-measuring elements 114 and 115 may measure angles of zero radians, e.g., if base portions 130 and 131 are positioned on a straight surface, for example, a surface having zero curvature, e.g., a flat table. In another example, angle-measuring elements 114 and 115 may measure two different angles, e.g., if base portions 130 and 131 are positioned on two respective curved surfaces having a different curvature.

According to some demonstrative embodiments of the invention, the angles θ1 and/or θ2 measured by elements 114 and 115, respectively, may depend on the locations in which base portions 130 and 131 engage the front surfaces of lenses 141 and 142, respectively. For example, spectacle lenses 141 and 142, when supported by frame 143 may define a flame front surface, denoted S, having a varying surface curvature. Lenses 141 and/or 143 may have, for example, a surface portion, denoted F, having a curvature being substantially infinite, e.g., at an end near a center of frame 143. Lenses 141 and 142 may also have surface portions, denoted C1 and C2, respectively, having a smaller curvature compared to the curvature of surface portion F. Accordingly, the angles θ1 and θ2, measured when angle-measuring elements 114 and 115 are positioned on surface portions C1 and C2, respectively, may be larger than the angles measured when angle-measuring elements 114 and 115 are positioned on surface portion F.

According to some demonstrative embodiments of the invention, the personalized lens-orientation value for spectacles 140 may be determined based on the value measured by angle-measuring element 114, e.g., at the vertex of lens 141; and/or based on the value measured by angle-measuring element 115, e.g., at a vertex of lens 142.

Although the invention is not limited in this respect, according to some demonstrative embodiments of the invention, it may be assumed that the curvature of the surface S is substantially symmetrical, e.g., with reference to an axis, denoted Z0. Accordingly, it will be appreciated by those of ordinary skill in the art, that the axes Z1 and Z2 may be substantially aligned with the vertex of lenses 141 and 142, for example, when the distance between angle measuring elements 114 and 115 is adjusted according to the pupil distance of the user, and base portions 130 and 131 are engaged with lenses 141 and 142, respectively, in a manner such that angles θ1 and θ2 are substantially equal. Accordingly, the personalized lens-orientation value for spectacles 140 may be determined by adjusting the distance between the angle measuring elements 114 and 115 according to the inter-pupil distance of the user; and engaging angle measuring elements 114 and 115 with the surfaces of lenses 141 and 142, respectively, such that angle measuring elements 114 and 115 measure substantially the same angle, e.g., as described below.

Although some demonstrative embodiments of the invention may relate to a device, e.g., device 110, including a set of marks, e.g., marks 126*a*, 126*b*, 126*a*, and/or 126*b*, to indicate measured angle values corresponding to angles θ1 and/or θ2, it will be appreciated by those of ordinary skill in the art that other embodiments of the invention may include any other suitable angle measuring configuration, mechanism and/or arrangement to measure any other angle, e.g., related to angles θ1 and/or θ2. For example, marks 126*a* and 125*a* may indicate an angle, denoted θ1', defined between the axis Z1 and a predefined axis, denoted N1', passing through pin 120; and/or marks 126*b* and 125*b* may indicate an angle, denoted θ2', defined between the axis Z2 and a predefined axis, denoted N2', passing through pin 121. It will be appreciated by those of ordinary skill in the art that the values of angles θ1 and/or θ2 may be determined based on angles θ1' and/or θ2', respectively. For example, direction N1' may intersect the outer surface of lens 141 at a distance D' from a point of intersection between the direction N2' and the outer surface of lens 142. In one example, marks 199 may be adapted to indicate the distance D. Accordingly, marks 125a and/or 126a may be adapted to indicate a value representing angle θ1, and/or marks 125b and/or 126b may be adapted to indicate a value representing angle θ2, e.g., when marks 199 indicate the distance D. In another example, marks 199 may be adapted to indicate an adjusted distance scale corresponding to the distance D'. Accordingly, marks 125a and/or 126a may be adapted to indicate a value representing angle θ1', and/or marks 125b and/or 126b may be adapted to indicate a value representing angle θ2', e.g., when marks 199 indicate the distance D'. In this example, the distance between pins 120 and 121 may be adjusted, e.g., by an optometrist, according to the inter-pupil distance of the user, e.g., 60 mm, while the angles measured by elements 114 and/or 115 may correspond to the distance D', e.g., 58 mm.

Figure 2:
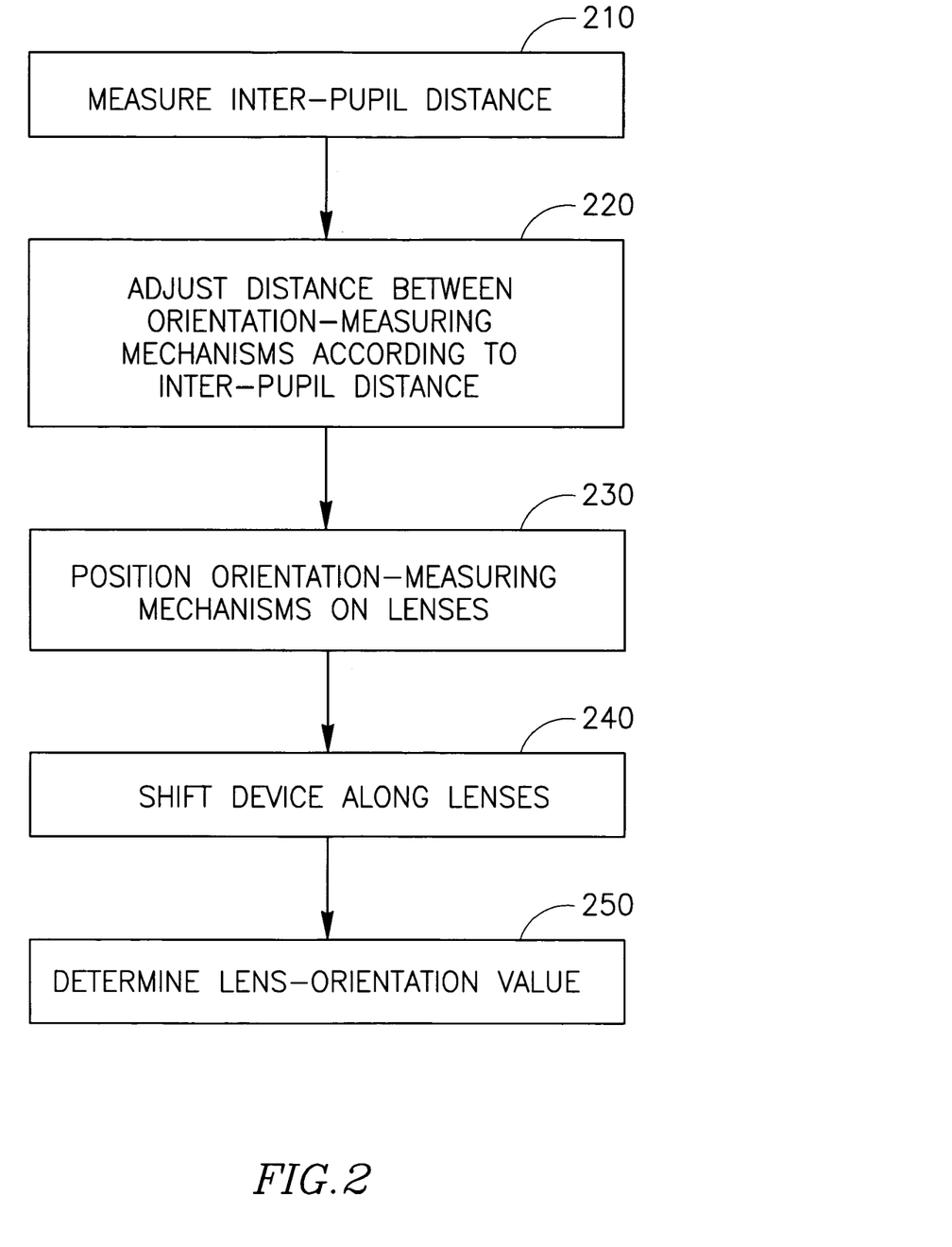
FIG. 2 is a schematic illustration of flow chart of a method for measuring a personalized lens-orientation value in accordance with some demonstrative embodiments of the invention.

Reference is made to FIG. 2, which schematically illustrates a flow-chart of a method of determining a personalized lens-orientation value for spectacles including a frame supporting a pair of lenses customized for a user, in accordance with some demonstrative embodiments of the invention. Although the invention is not limited in this respect, one or more operations of the method of FIG. 2 may be performed, e.g., by an optometrist, using a lens-orientation measuring device, e.g., device 110 (FIG. 1), including a pair of orientation measuring mechanisms, e.g., including angle measuring elements 114 and 115 (FIG. 1); and an adjustable positioning mechanism, e.g., including slides 111a and 111b (FIG. 1).

As indicated at block 210, the method may include, for example, measuring an inter-pupil distance of the user. The inter-pupil distance may be measured, for example, using any suitable pupil-distance measuring device, e.g., as described below with reference to FIG. 4.

As indicated at block 220, the method may also include, for example, adjusting the distance between the angle-measuring mechanisms according to the measured inter-pupil distance. For example, the optometrist may adjust the distance D between angle measuring elements 114 and 115 (FIG. 1) using marks 199 (FIG. 1).

As indicated at block 230, the method may also include, for example, engaging the pair of orientation mechanisms with the pair of lenses, respectively. For example, the optometrist may position angle-measuring elements 114 and 115 (FIG. 1) such that base portions 130 and 131 (FIG. 1) engage lens 141 and 142, respectively, e.g., as described below.

Figure 3A:
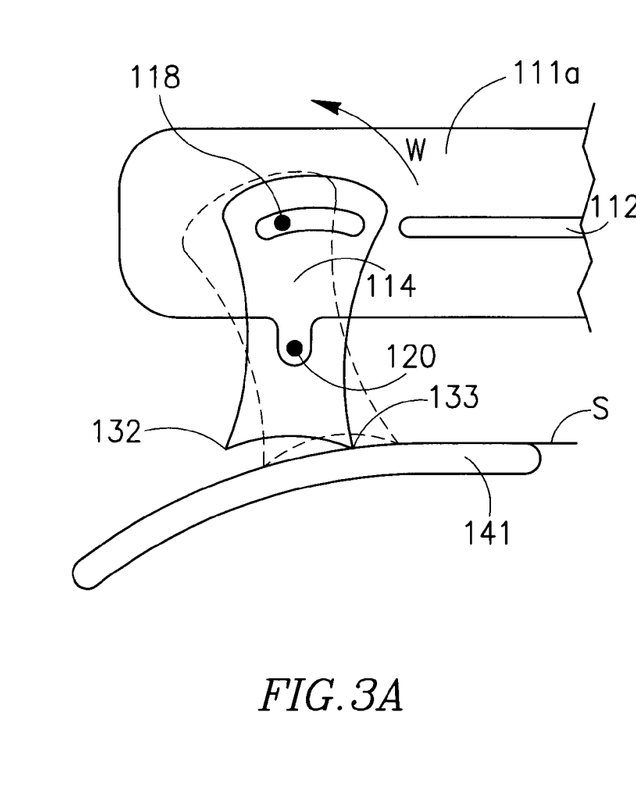
FIGS. 3A and 3B are schematic illustrations of first and second orientation-measuring mechanisms of the measuring device of FIG. 1 engaging first and second spectacle lenses, respectively, in accordance with some demonstrative embodiments of the invention.
Figure 3B:
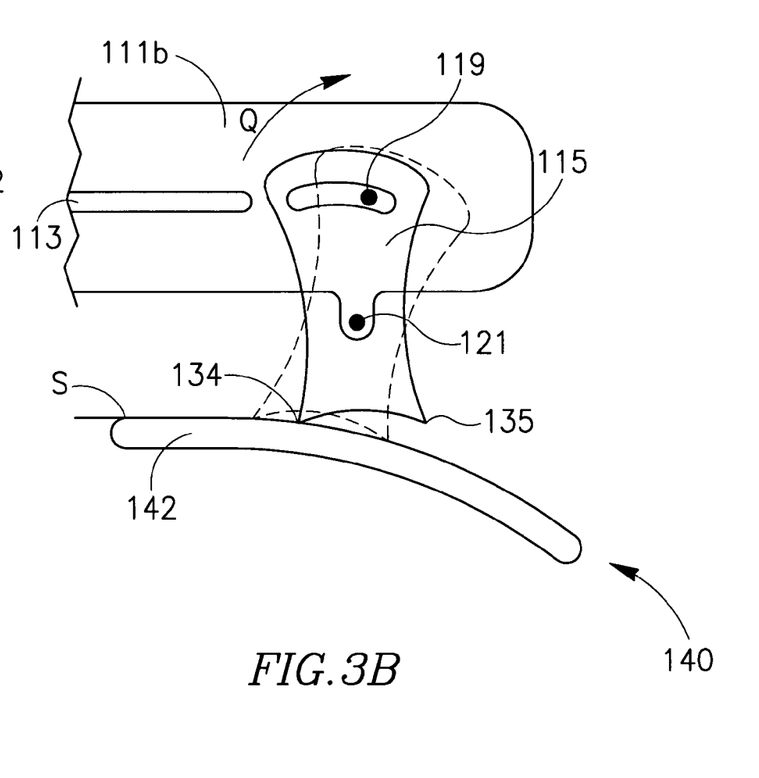

Reference is now made again to FIGS. 3a and 3B, which schematically illustrate angle-measuring elements 114 and 115, respectively, engaging spectacle lenses 141 and 142, respectively. As shown in FIG. 3A, base portion 130 may be positioned in an initial position such that, for example, engagement point 133 may be engaged with lens 141 while engagement point 132 may not be engaged with lens 141. Angle measuring element 114 may be rotated, for example, in a counterclockwise direction, as indicated by the arrow W, e.g., until both points 132 and 133 are engaged with lens 141. Similarly, base portion 131 may be positioned in an initial position such that, for example, engagement point 134 may be engaged with lens 142 while engagement point 135 may not be engaged with lens 142. Angle measuring element 11.5 may be rotated, for example, in clockwise direction as indicated by the arrow Q, e.g., until both points 134 and 135 are engaged with lens 142. Positioning both engagement points 132, 133 of base portion 130 on lens 141 and positioning both engagement points 134 and 135 of base portion 131 on lens 142, may result in angle-measuring elements 114 and 115 being steadily engaged with lenses 141 and 142, respectively.

Referring back to FIG. 2, as indicated at block 240 the method may also include, for example, shifting the lens-orientation measuring device along the pair of lenses, e.g., until the both orientation-measuring mechanisms indicate substantially the same orientation value. For example, the optometrist may shift device 110 (FIG. 2) along lenses 141 and 142, e.g., in a longitudinal direction, until angle-measuring elements 114 and 115 (FIG. 1) measure substantially the same angle.

As indicated at block 250, the method may also include, for example, determining the lens-orientation value for the spectacles based on the orientation value measured by the personalized orientation measuring mechanisms. For example, the optometrist may determine the personalized lens-orientation value of the spectacles based on the angle measured by angle measuring elements 114 and 115 (FIG. 1), e.g., using mark sets 126a and 126b (FIG. 1).

Figure 4:
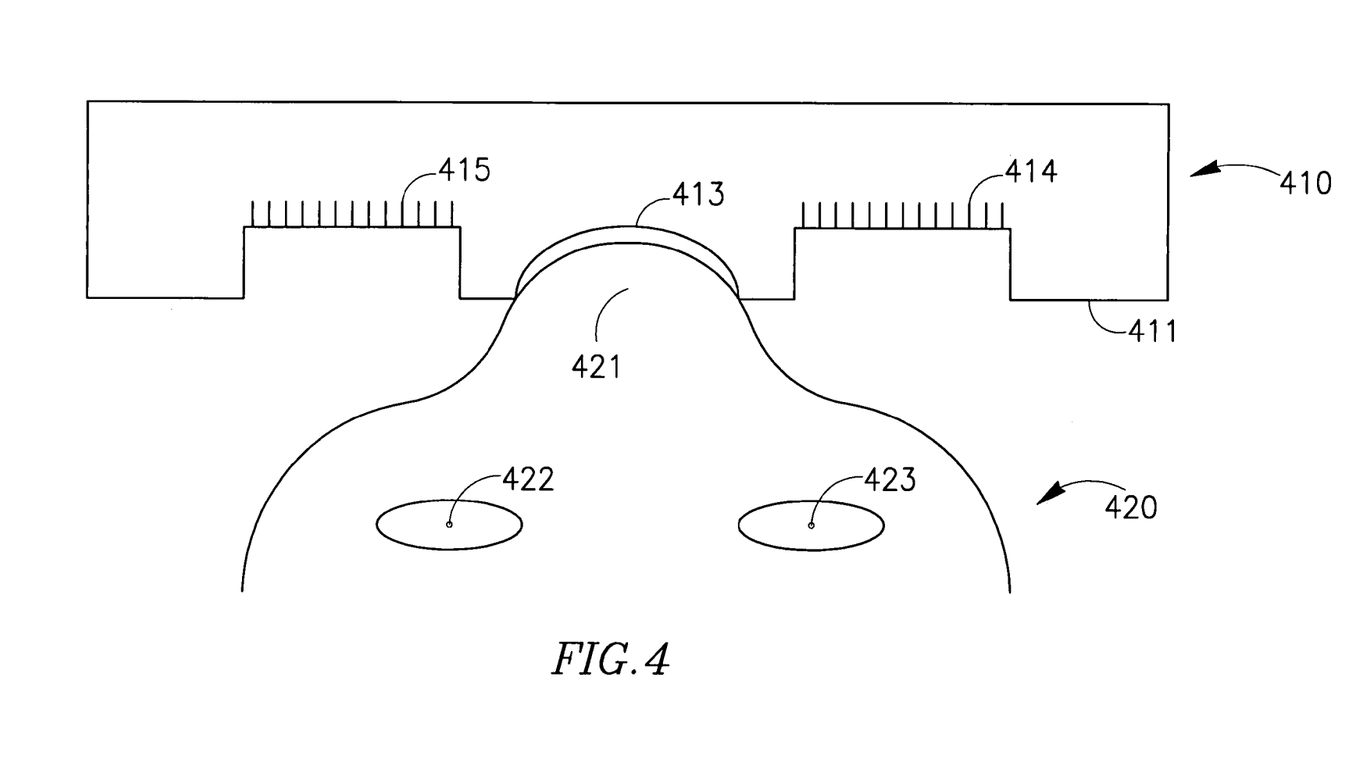
FIG. 4 is a schematic illustration of a conventional inter-pupil distance ruler.

Reference is made to FIG. 4, which schematically illustrates a conventional inter-pupil distance ruler 410 to measure an inter-distance pupil of a person 420.

Ruler 410 may include a ruler edge 411 having marks 414 and 415 which may correspond to a scale for the measurement of length. Ruler edge 411 may be configured to enable positioning ruler 410 in relation to a pair of pupils 422 and 423 of person 420. For example, edge 411 may have a portion 413 curved inward to ruler 410. Portion 413 may enable engaging steadily ruler 410 on, for example, a bridge 421 of a nose of person 420. Accordingly, ruler 410 may be fixed with regard to horizontal movement relative to person 420, and may enable determining the inter-pupil distance of person 420. For example, ruler 410 may be positioned such that a user of ruler 410, e.g., an optometrist, may determine the pupil distance of person 420 by reading values corresponding to a measurement of length indicated by marks 414 and 415. For example, the user may use marks 414 to determine the distance, e.g., 30 mm, from bridge 421 to pupil 422. Similarly, the user may use marks 415 to determine the distance, e.g., 27 mm, from bridge 421 to pupil 423, which may be, for example, 27 mm. As a result, the inter-pupil distance of person 420 may be determined as 30 mm+27 mm=57mm.

According to some demonstrative embodiments of the invention, the lens-orientation measuring device, e.g., device 110 (FIG. 1), may be configured to perform the functionality of ruler 410. For example, device 110 (FIG. 1) may be modified to include a curved portion 179 (FIG. 1), e.g., movably connected to slides 111a (FIG. 1) and/or 111b (FIG. 1), and adapted to steadily engage bridge 421.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device to determine a personalized lens-orientation value for a spectacle frame supporting a pair of lenses customized for a user, the device comprising:

a pair of orientation-measuring mechanisms, each mechanism adapted to measure a value corresponding to an angle orientation of a surface of a respective one of said lenses relative to a reference axis; and an adjustable positioning mechanism to adjust a distance between said pair of orientation-measuring mechanisms according to an inter-pupil distance of the user.

2. The device of claim 1, wherein said reference axis is related to a line of sight of said user through said pair of lenses.

3. The device of claim 1, wherein said reference axis is related to an axis connecting first and second engagement points of said pair of orientation-measuring mechanisms with said pair of lenses, respectively.

4. The device of claim 1, wherein each of said pair of orientation-measuring mechanisms comprises a rotatable angle measuring element slidably mounted on said adjustable positioning mechanism.

5. The device of claim 4, wherein the angle measuring element has a base adapted to engage a surface portion of said lens.

6. The device of claim 5, wherein said surface comprises a front surface portion of said lens.

7. The device of claim 5, wherein said angle-measuring element is to measure a value corresponding to an angle between a direction normal to said surface portion and said reference axis.

8. The device of claim 5, wherein said base portion has a concave surface to engage said surface portion at two or more engagement points.

9. The device of claim 8, wherein a radius of curvature of said concave surface is smaller than 1000 millimeters.

10. The device of claim 9, wherein said radius of curvature is smaller than 500 millimeters.

11. The device of claim 4 comprising two sets of marks, each to indicate a plurality of predefined orientation values representing a plurality of angles to be measured by one of said angle-measuring elements.

12. The device of claim 11, wherein at least one of said two sets of marks includes one or more marks on a respective one of said angle-measuring elements and one or more marks on said adjustable positioning mechanism.

13. The device of claim 11, wherein said plurality of angle values includes angle values between −5 degrees and 30 degrees.

14. The device of claim 13, wherein said plurality of angle values includes angle values between 0 degrees and 15 degrees.

15. The device of claim 1, wherein said positioning mechanism comprises a pair of interconnected slides attached to said pair of orientation-measuring mechanisms, respectively, and wherein said pair of slides are movable with respect to one another along a longitudinal axis.

16. The device of claim 15, wherein said positioning mechanism comprises a first pin attached to a first slide of said pair of slides and fitted to move along a groove in a second one of said slides.

17. The device of claim 1, wherein said positioning mechanism comprises a set of marks indicating a plurality of inter-pupil distance values, wherein the distance between said pair of orientation-measuring mechanisms is adjustable according to said set of marks.

18. The device of claim 17, wherein said plurality of inter-pupil distance values include distance values between 55 and 70 millimeters.

19. Optical spectacles customized for a user, the spectacles comprising:

a spectacle frame; and a pair of lenses supported by said frame, at least one of said lenses comprising a personalized lens having a surface shaped in accordance with a personalized lens-orientation value, which is based at least in part on an inter-pupil distance of said user and a curvature of said frame.

20. The spectacles of claim 19, wherein said personalized lens-orientation value corresponds to an angle defined between a reference axis and a direction normal to a surface of said personalized lens at a location corresponding to a vertex of said personalized lens.

21. The spectacles of claim 20, wherein said vertex is located substantially at an intersection between said outer surface and a line of sight of a pupil of said user.

22. The spectacles of claim 21, wherein said surface comprises a front surface of said lens.

* * * * *